G. W. KLEIN.
Evaporator.
No. 1,035.
Patented Dec. 15, 1838.
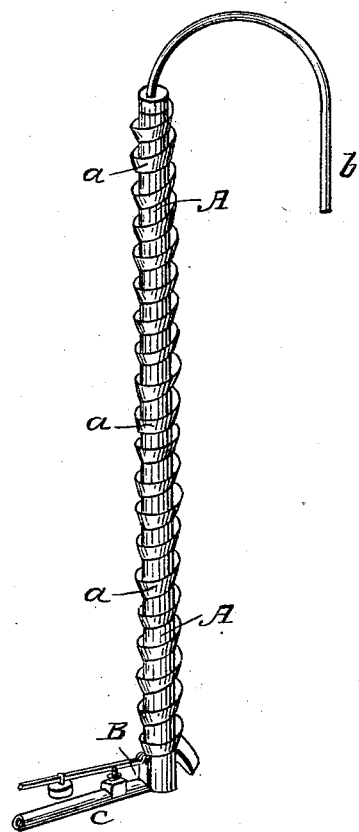

UNITED STATES PATENT OFFICE.

GEORGE W. KLEIN, OF BOSTON, MASSACHUSETTS.

IMPROVED APPARATUS FOR EVAPORATING THE EXTRACT OF BARK AND OTHER LIQUIDS.

Specification forming part of Letters Patent No. 1,035, dated December 15, 1838.

*To all whom it may concern:*

Be it known that I, GEORGE W. KLEIN, of Boston, county of Suffolk, and State of Massachusetts, have invented new and useful improvements in evaporating such liquid parts of the extract of oak-bark or other astringent matters containing tannin as are not necessary in preparing skins or converting the same into leather, or, in other words, reducing the extract of bark or other astringent matters to the consistence of what tanners denominate the "gum," of which the following is a specification.

My improvements are also applicable to the evaporation of saccharine and saline liquids, and may be employed in the manufacture of sugar, salt, or other substances which generally remain after the liquids in which they are held in solution or suspension are dissipated by heat.

The disposition, arrangement, and use of the several parts of these improvements, the principles thereof, and several modes in which I have contemplated the application of that principle or character by which they may be distinguished from other inventions, together with those parts, improvements, or combinations which I claim as my inventions or discoveries, I have fully set forth and described in the following specification and accompanying drawing.

The old process of tanning skins by bark has been subject to great inconvenience of transportation of the material in a very bulky state—that is to say, after the bark was stripped from the tree and properly dried, it was necessary to carry it to the place of grinding, and where to be used in the preparation of leather. In proportion to the remoteness of these localities, so was the inconvenience and expense of transportation increased.

The idea of extracting from the bark its astringent properties and transporting the same in a reduced state has suggested many improvements in the mode of preparing or concentrating the extract of bark or changing it to the state of the gum. All these different inventions or methods consist in evaporating a portion of the extract by boiling in various ways.

My improvement is represented by Plate I, and consists in winding around the exterior of a metallic steam-box, A, a strip of metal, *a a a a*, and soldering the lower edge to the outside of the steam box or cylinder A, or otherwise properly connecting the same thereto, while the upper edge is made to project from the side of the cylinder. By these means I form a descending groove throughout the exterior of the steam-cylinder, similar to the thread of a screw.

The box A may be made of metal or other suitable material, shaped and formed as seen in the drawing, or otherwise properly constructed. To the top or any other convenient part a steam-pipe, *b*, leading from a steam-boiler, is attached, and to the bottom or other proper part another pipe, *c*, is fixed, having a safety-valve, B, with its lever and weight fixed thereon. The object of the pipe *c* is to convey off the water which collects by condensation of the steam. In lieu of steam, hot air may be introduced in any convenient manner should the same be preferred. After the bark or other substance used is properly steeped in water, the infusion is poured by any convenient means into the upper part of the winding groove, which it traverses from top to bottom. Passing over a great extent of surface, it is heated, boiled, and a suitable portion evaporated before it reaches the lower end, where the residuum passes into a proper receptacle in the consistence of what tanners term the "gum." A saccharine, saline, or other liquid to be reduced may be passed into the top of the descending groove, and thus the whole, or such portion thereof as may be required, may be evaporated in a similar manner. The whole apparatus is to be properly surrounded by a wooden box, which prevents condensation and facilitates the process. During the passage of the infusion from the top of the groove to the bottom of the same it traverses a great extent of heated surface, and thus the operation of evaporating the watery parts is much more speedily conducted than in any other mode heretofore used.

What I claim as my invention is—

The within-described apparatus for the purpose of evaporating infusions of bark or other infusions or liquids—that is to say, an apparatus consisting of a hollow vertical shaft, through which steam is to be passed, and around which there is a spiral groove or channel, down which the fluid to be evaporated is made to descend, the whole constructed and operating substantially in the manner above set forth.

In testimony that the above is a true specification of my said inventions I have hereunto set my hand and seal this 14th day of June, in this year 1838.

GEO. W. KLEIN. [L. S.]

Witnesses:
 R. H. EDDY,
 FRANKLIN DARRACOTT.